H. D. DARGERT.
CAR JOURNAL BEARING.
APPLICATION FILED JAN. 7, 1915.
1,178,632.
Patented Apr. 11, 1916.
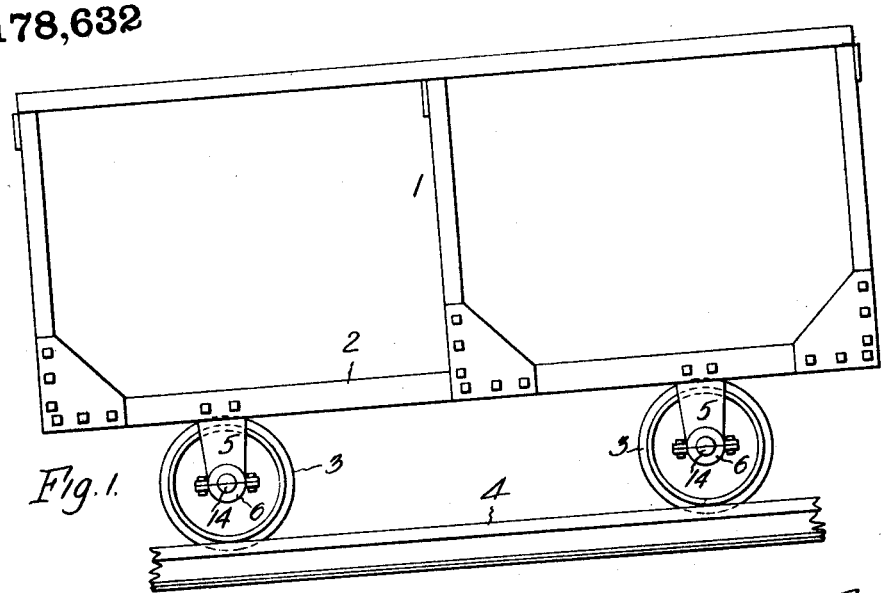
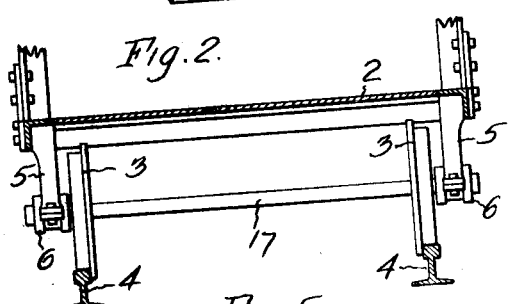
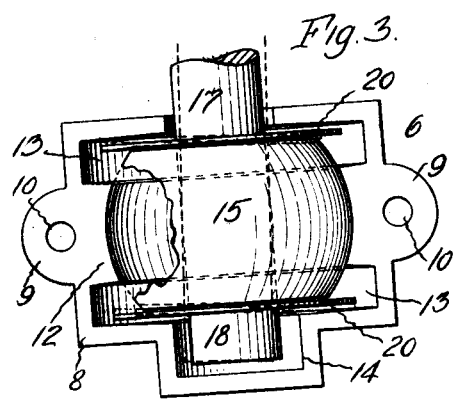
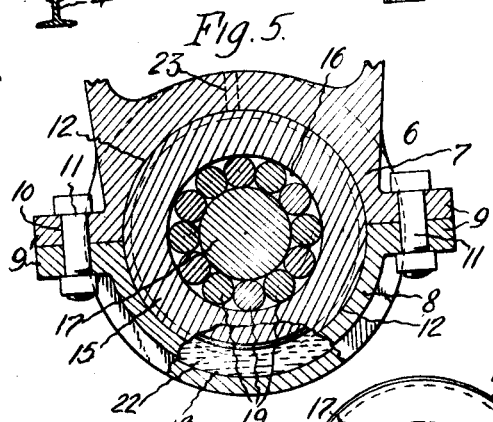
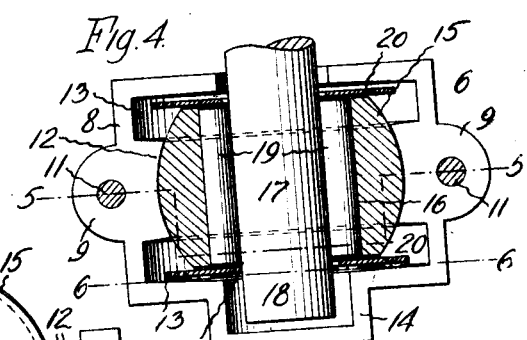
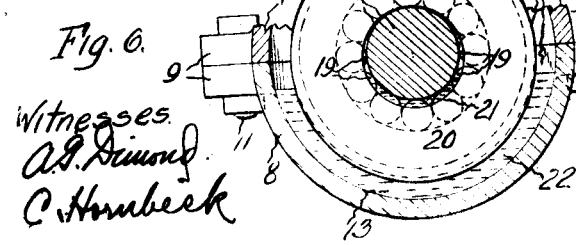
Witnesses
A. G. Dimond
C. Hornbeck
Inventor
Henry D. Dargert
by Wilhelm & Parker
Attorneys

UNITED STATES PATENT OFFICE.

HENRY D. DARGERT, OF SALAMANCA, NEW YORK.

CAR-JOURNAL BEARING.

1,178,632.

Specification of Letters Patent.

Patented Apr. 11, 1916.

Application filed January 7, 1915. Serial No. 928.

*To all whom it may concern:*

Be it known that I, HENRY D. DARGERT, a citizen of the United States, residing at Salamanca, in the county of Cattaraugus and State of New York, have invented a new and useful Improvement in Car-Journal Bearings, of which the following is a specification.

This invention relates to that class of anti-friction bearings for car journals or shafts in which the journal bears on rollers which surround the journal and are movably supported in a casing or support so as to permit the journal to tilt or assume different angular relations to the casing.

The bearing as described may be used on different kinds of cars or rolling stock but is particularly adapted for use on so called "brick" cars, which are comparatively small cars adapted to be propelled on tracks connecting the various parts of a brick yard and serving as a means for transporting bricks from one portion of the yard to another. The tracks on which such cars run are usually more or less uneven and rough and the journal bearings commonly used on this type of cars tend to bind and to wear rapidly, because of their inability to adjust themselves readily to this condition.

One object of this invention is to provide a simple and inexpensive roller bearing which cannot get out of alinement and which is of such flexible construction that deviation or variation of the journal or shaft relative to the bearing support will not cause any binding of the parts of the bearing.

Another object of the invention is to provide a roller bearing of this kind of such construction that all the parts thereof are kept constantly lubricated and in which the strain on such parts is reduced to the smallest possible amount.

In the accompanying drawings: Figure 1 is a side elevation of an ordinary type of brick car provided with bearings embodying the invention. Fig. 2 is a transverse sectional elevation of the lower portion of the car. Fig. 3 is a plan view of the bearing, partly broken away and with the upper half of the outside casing removed. Fig. 4 is a similar view in section. Fig. 5 is a section on line 5—5, Fig. 4, with a portion broken away. Fig. 6 is a section on line 6—6, Fig. 4.

The bearing consists of a hollow bearing support or inclosing casing connected by suitable means to the car in the usual manner and having a hollow substantially spheroidal roller holder mounted therein and adapted to receive the car journal or shaft. A number of bearing rollers are loosely confined within the roller holder around the journal, and annular plates having central openings therein of sufficient diameter to allow the plates to ride loosely on the axle journal are provided at each end of the roller holder between the same and the end walls of the casing. The roller holder is mounted upon a concave seat portion formed in the inclosing casing and adapted to rock or tilt thereon.

1 represents a car of the type ordinarily used in brick yards, having the bottom portion 2 and wheels 3 adapted to run on tracks 4. Standards 5 are bolted or fastened to the bottom portion of the car in any suitable manner and to said standards are attached the outside casings 6 of the bearing by bolts.

The outside casing of the bearing preferably consists of two semi-cylindrical sections 7 and 8, each section having lugs 9 thereon provided with openings 10 adapted to receive bolts 11, by means of which the two sections of the casing are fastened together. Each section of the casing has a raised central seat portion 12 and recesses or relatively depressed side portions 13 formed therein.

14 represents an extension formed in the central portion of one end wall of the outside casing, which extension has a greater diameter than that of the car journal.

15 represents a substantially spheroidal roller holding member having an opening 16 therein. This member has an external spherical surface and is mounted with the central portion of this surface in contact with the portion 12 of the outside casing, the latter forming a seat or support for the roller holder. The opening 16 of the roller holder is of sufficient size to receive the car journal 17 which passes through it and has its end 18 projecting into the extension 14 of the outer casing. Rollers 19 are loosely arranged in the roller holder around the journal and are kept in place within this holder by means of flat annular disks or washers 20 having openings 21 at their centers through which the car journal passes. These openings are slightly larger in diameter than the shaft journal, and the disks are therefore loosely seated on the journal shaft and revolve therewith. They extend downwardly into the recessed portions 13 of the outer casing and have their horizontal movement on the shaft limited by the rim of the spheroidal member and the end walls of the casing.

The recesses 13 of the casing are adapted to contain lubricating oil, as shown in Figs. 5 and 6 of the drawings at 22, and as the disks or washers 20 revolve in said casing they carry up the oil from the casing and distribute it freely and thoroughly over the shaft and rollers, so that the latter are always well lubricated thereby. Oil holes 23 may be provided in the upper part of the casing by means of which the recesses 13 may be filled with oil, and such recesses are of sufficient size to hold a considerable quantity of oil and thus require but little attention.

By providing each axle of the car with two bearings constructed according to this invention, the bearings automatically assume any position necessary to keep in absolute alinement despite any inequalities in the tracks, and binding of the various parts is therefore reduced to a minimum. As the roller holder is located entirely within the outer casing, all of its parts can be made of any required thickness and it is not necessary to weaken the outer casing with large openings for the end portions of the roller holder.

I claim as my invention:

1. The combination of a journal, a casing, one end of said casing having an opening to receive the journal and the casing being provided with a concaved seat, a roller holder having a central opening therein through which the journal passes, said roller holder having an external segmental spherical surface, and being adapted to bear and rock in the concaved seat of the casing, rollers arranged within said roller holder around the journal, said roller holder being disposed wholly within said casing between the end walls thereof, and annular plates loosely surrounding the journal between the ends of said roller holder and the casing, said plates being confined between the ends of the casing and the ends of the roller holder and serving to confine the said rollers within the holder.

2. The combination of a journal, a two-part cylindrical casing, one end of said casing having an opening to receive the journal and the other end of the casing having a reduced extension formed therein into which the end of the journal projects, the casing having a concaved segmental spherical seat portion in the interior thereof, and relatively depressed portions at each side of the seat portion, a hollow roller holding member within said casing having a segmental spherical external portion supported by the concaved seat portion of the casing and adapted to rock thereon, rollers within the roller holder arranged around the journal, and annular plates mounted loosely on the journal at each end of the roller holder and located in the depressed portion of the casing and confined between the ends of the casing and the ends of the roller holder.

3. The combination of a journal, a casing, one end of said casing having an opening to receive the journal and the casing being provided with a raised concaved seat portion in the interior thereof, and recessed portions adapted to contain oil and located at each side of the raised seat portion, a roller holder having a central opening therein through which the journal passes, said roller holder having an unbroken external segmental spherical portion supported by the seat portion of the casing and adapted to rock thereon, rollers arranged within said roller holder around the journal, and annular rings loosely mounted on the journal and adapted to turn in the recessed portions of the casing and to hold the rollers in position in the holder.

Witness my hand in the presence of two subscribing witnesses.

HENRY D. DARGERT.

Witnesses:
NETTIE M. LANSING,
MURIEL E. BEATTIE.